June 3, 1969  R. A. RIGHTMIRE  3,447,968
ELECTRICAL ENERGY STORAGE DEVICE AND METHOD
OF STORING ELECTRICAL ENERGY
Filed June 30, 1966  Sheet 1 of 3

INVENTOR.
ROBERT A. RIGHTMIRE
BY
Schramm, Kramer & Sturgeon
ATTORNEYS.

June 3, 1969 R. A. RIGHTMIRE 3,447,968
ELECTRICAL ENERGY STORAGE DEVICE AND METHOD
OF STORING ELECTRICAL ENERGY
Filed June 30, 1966 Sheet 2 of 3
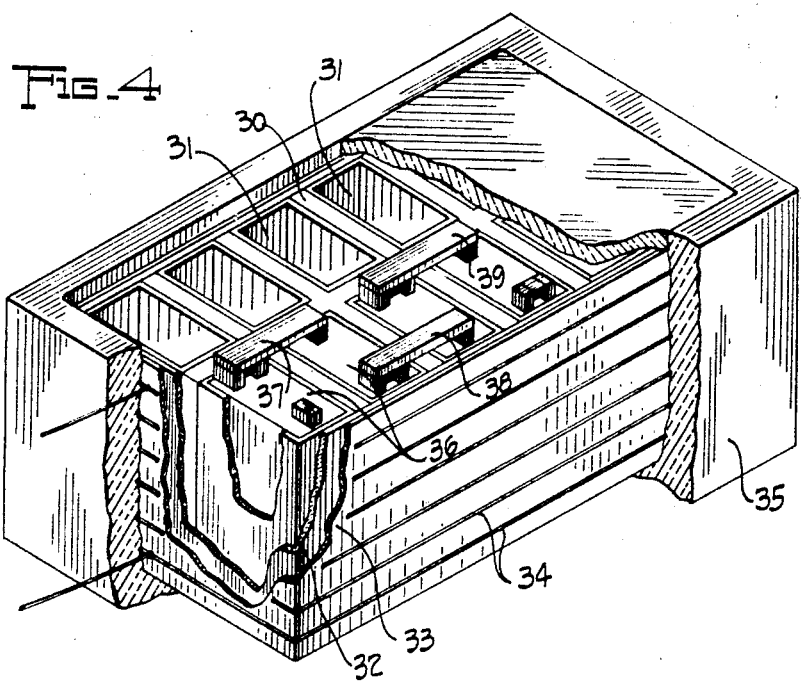
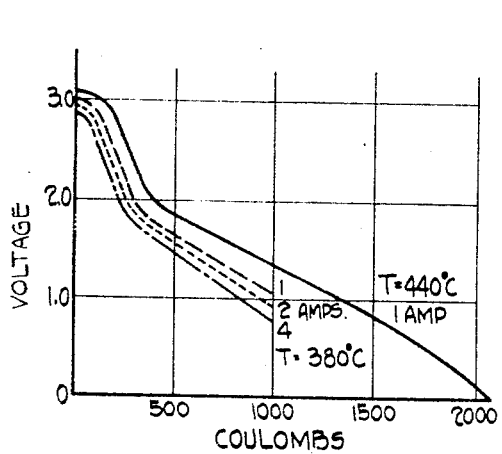
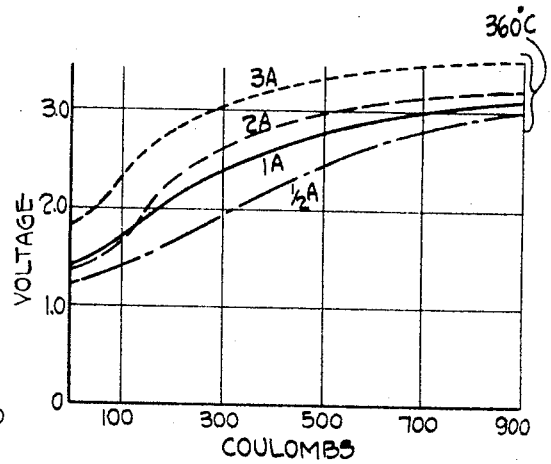
INVENTOR.
ROBERT A. RIGHTMIRE
BY
Schramm, Kramer & Sturgeon
ATTORNEYS.

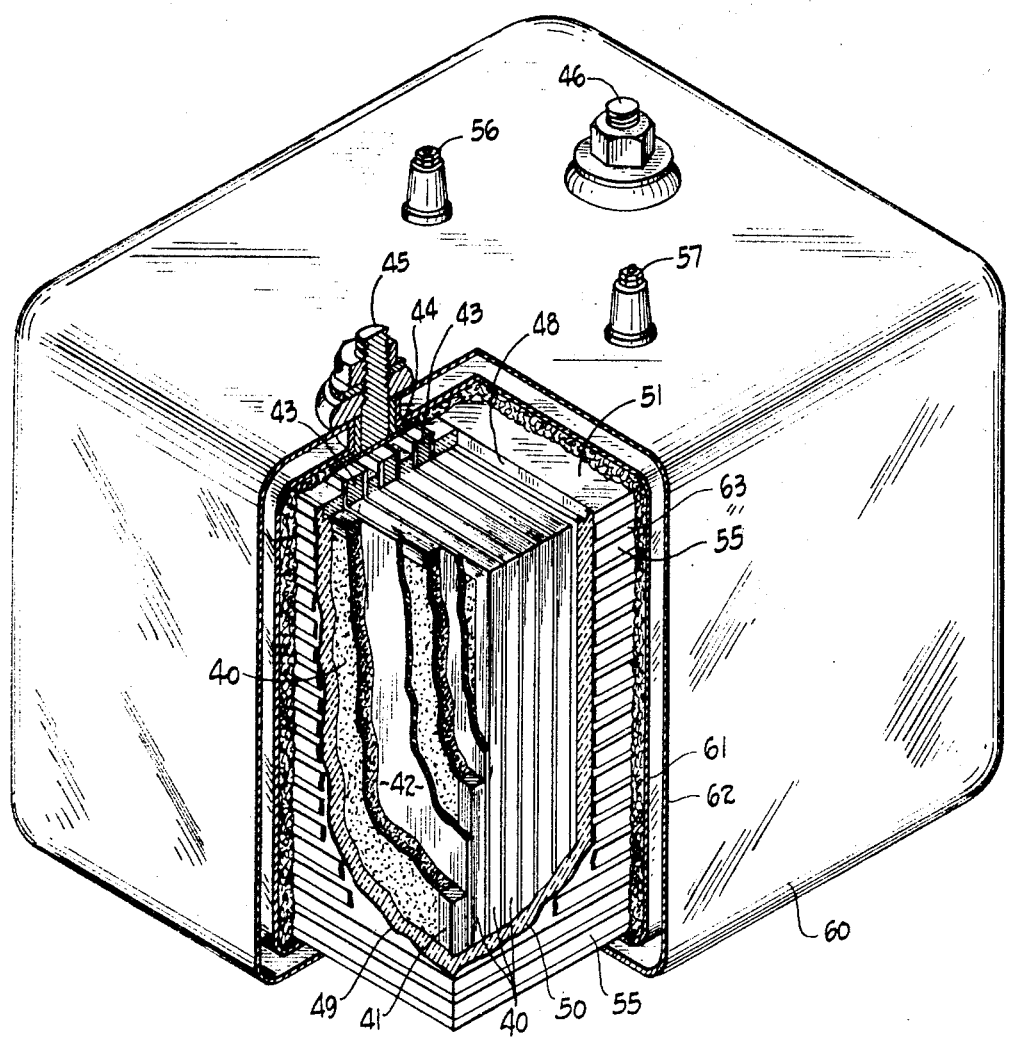
FIG_7

United States Patent Office 3,447,968
Patented June 3, 1969

3,447,968
ELECTRICAL ENERGY STORAGE DEVICE AND METHOD OF STORING ELECTRICAL ENERGY
Robert A. Rightmire, Northfield, Ohio, assignor to The Standard Oil Company, Cleveland, Ohio, a corporation of Ohio
Continuation-in-part of application Ser. No. 424,427, Jan. 8, 1965. This application June 30, 1966, Ser. No. 578,108
Int. Cl. H06m 35/30, 43/06, 13/02
U.S. Cl. 136—6                         6 Claims

ABSTRACT OF THE DISCLOSURE

A secondary battery operable above the melting point of the electrolyte, comprising a fused salt electrolyte and a pair of spaced electrodes immersed in the electrolyte, one of the electrodes, the cathode, being made of activated carbon having a surface area in excess of 100 m.$^2$/cc.

---

This application is a continuation-in-part of Ser. No. 424,427, filed Jan. 8, 1965, now abandoned. Application Ser. No. 424,427 is, in turn, a continuation-in-part of Ser. No. 263,275, filed Mar. 6, 1963, now abandoned.

This invention relates to an electrical energy storage device, in the form of a cell or battery, and to a method of storing electrical energy.

The term "storage" as used herein to describe the inventive device (cell or battery) is intended to have its recognized definition, as for instance:

"The term 'storage' cell is reserved by some authorities to indicate those cells in which the reactions are reversible; in these cells the active materials can be returned to their original state by 'charging' (applying electrical current from an external source in the opposite direction to the flow of the cell's discharge current). These reversible cells are also commonly called 'secondary' cells as opposed to the 'primary' cells in which the active materials at the end of discharge, for one reason or another, are in such condition that they cannot be returned to their original form."

This quotation appears in Kirk-Othmer, Encyclopedia of Chemical Technology, Second Edition, vol. 3, p. 161.

Leclanche cells (popular dry cells of the ammonium chloride-manganese dioxide-zinc type) and fuel cells are common examples of "primary," nonrechargeable cells. Primary cells are one-way generators of electrical energy—they are not energy storage devices and are to be distinguished on this and other bases from the rechargeable, or secondary, energy storage device of the present invention.

In general terms, it can be said that the inventive device relates to a sealed, self-contained electrical energy storage device comprising in combination, a housing providing a cavity; a pair of porous electron conductors, one functioning as a cathode and the other as an anode, disposed in spaced relation from each other within said cavity, the electron conductor functioning as the cathode having a surface area in excess of 100 m.$^2$/cc. as measured by the B.E.T. method; a current collector connected to each electron conductor; a body of a crystalline ion progenitor having a predominantly fused ionic lattice adapted to be thermally disordered to provide an ion-containing and conducting medium, filling the remainder of said cavity and encasing substantially the entire geometric surface area of said electron conductors save for the areas obstructed by said current collector connections, and substantially uniformly impregnating the same; and means coacting with said ion progenitor to thermally disorder the crystalline structure thereof and provide an ion-containing and conducting medium; said electron conductors coacting with the thermally disordered ion progenitor, in response to the application of an electrical potential across said electron conductors to develop and store electric energy.

Also, in general terms, the inventive method relates to a method of storing electrical energy which comprises assembling in spaced relationship within a housing, a pair of high surface area electrodes, filling the housing with a fusible salt electrolyte, heating said electrolyte to at least its fusion temperature, applying an external electrical charge to said electrodes, thereby developing an internal electrical charge at the interfaces between the electrodes and electrolyte, and cooling the electrolyte to at least below its fusion temperature, thereby "freezing" said internal electrical charge as stored electrical energy.

The energy stored in accordance with this procedure can be expended by heating the electrolyte to at least its fusion temperature, and electrically connecting the electrodes across an electrical load.

The energy so expended can be restored to the device by heating the electrolyte to at least its fusion temperature, applying an electrical charge to the electrodes, thereby developing an internal electrical charge at the interfaces between the electrodes and electrolyte, and cooling the electrolyte to at least below its funsion temperature, thereby "freezing" said internal electrical charge as stored electrical energy.

The inventive method additionally includes the concept of charging, discharging and recharging electrical energy while maintaining the electrolyte in a fused state.

Immediately apparent from this discussion is that the invention is concerned with a fused salt, energy storage device.

Fused salt electrolytes have heretofore been used in "primary" cells, such as fuel cells, for the one-way generation of electrical energy. However, the development of a rechargeable, fused salt energy storage device required the application of different principles and theoretical considerations and the translation of these into structural relations not found in, and in fact detrimental to the operativeness of fuel cells.

For instance, my energy storage device develops its capacity by building up a charge at the electrode-electrolyte interface. The greater the interface area, the greater the capacity of the device. Thus, in my device, it is necessary that the electrolyte encase substantially the entire geometric surface area of the electrodes and substantially uniformly impregnate them.

In fuel cells, by contrast, operativeness depends on the existence of a gas-electrolyte interface at the electrode surface. This is accomplished variously by limiting electrolyte penetration of the electrode to short distances, usually less than 0.5 mm. (see Kirk-Othmer, supra, at p. 139); or by providing the electrode with an electrolyte-free gas cavity (see U.S. Patent 2,384,463).

A sealed, self-contained electrode-electrolyte housing is another structural feature of my device which is inimicable to the operativeness of a fuel cell. The electrode-electrolyte housing for the latter must have inlet ports for fuel and outlet ports for reaction products.

A greater understanding of the invention may be had from the following detailed description and the annexed drawings, in which:

FIG. 4 is a partially cut away perspective view of a storage device including an assembly of units such as shown in FIG. 3.

FIG. 5 is a graph showing discharge characteristics of a cell unit constructed as shown in FIG. 2.

FIG. 6 is a graph showing charge characteristics of a cell unit constructed as shown in FIG. 2.

FIG. 7 is a perspective view of another embodiment of the electrical energy storage device of FIG. 4 with a portion partially cut away.

Figure 1A:
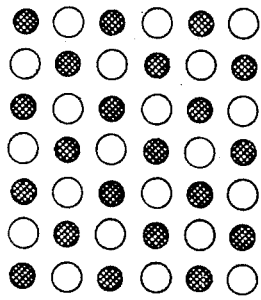
FIGS. 1A and 1B are diagrammatic representations of different ionic orders of a crystalline material.

Generally, separated opposite electrical charges represent a potential energy state. Ordinarily, when these charges are brought together the potential energy is discharged. Hence, where an electron conductor is connected across a difference of electrical potential to form a closed circuit there results a continuous flow of electrical current in the electrical circuit. If the electron conductor is divided and separated by a relatively nonelectron conducting portion in the circuit, the flow of current is only transitory with the result that the electrical charges are stored at the boundaries between the electron conducting and the nonelectron conducting portions of the circuit.

Thus, in a conventional capacitor, electrical energy is stored across the boundaries between a pair of electron conductors and a nonelectron conductor, e.g., a nonelectron conducting medium. The principal limitations on the amount of energy that can be stored in such a capacitor are the breakdown or decomposition potential of the nonelectron conducting medium, the specific area of the boundary, and the distance between the boundaries. It has been determined that the capacity of such a device is proportional to the specific area of the boundary and inversely proportional to the distance between the boundaries.

In accordance with this invention, I propose increasing the specific surface area of the boundary without increasing the overall physical size by providing as at least the positive electrode, and desirably both the positive and negative electrodes, highly porous electron conductor means the interstices of which form extensive boundary surfaces adapted to be exposed to a nonelectron conducting medium to store electrical energy. Heretofore, this has not been considered feasible because it was thought that a charge could not be sustained in a cavity. Indeed, this proposition has led to the concept of the Faraday cage which has many useful applications in the electrical arts. However, I have found that this limitation does not apply where the cavities are interconnected pores which can be penetrated by the opposing charge conductor such as an ion-containing and conducting medium.

Further, in accordance with this invention, I have discovered that the increased surface area provided by highly porous electron conductor means can be utilized to an unexpected optimum extent by employing as the non-electron conductor an ion-containing and conducting medium in which the ions will transport their charge directly to the appropriate boundary surface throughout the highly porous electron conductor means. The extremely small size of the ionic charge carriers and the very high concentration of them in such a medium permits the storage of electrical energy to a wholly unexpected magnitude beyond that attainable with conventional capacitors of comparable size. The utilization of an ion-containing and conducting medium also materially decreases the otherwise limiting spatial dimension between the coacting charge conductors to the space between opposed charges on the electron conductor and the adjacent ions. This difference is apparent when the equivalent electrical circuit of such an arrangement is compared with that of a conventional capacitor. Thus, the equivalent circuit for a conventional capacitor is a single capacitance, whereas the equivalent electrical circuit for the apparatus of the present invention is represented by a pair of capacitors, each corresponding to one of the interfaces respectively, connected in series.

For the purposes of this invention, an ion-containing and conducting medium is any medium which comprises a source of ions that are mobile and free to move within the medium. Thus, a compound which dissociates into ions when dissolved in a solvent such as water is one type of ion-containing and conducting medium. However, any ion progenitor in which the ions can be rendered relatively mobile will meet the definition of an ion-containing and conducting medium for the purpose of this invention.

For illustrative purposes, one may consider that the state of matter is such that it tends towards an ordered organization of its parts reflecting a characteristic compromise of the internal and external forces to which it is subjected. The equilibrium of this organization can be overcome by a change in the applied forces that will impose a new and different order of organization which represents the equilibrium under that condition of applied forces. Theoretically, all types of matter have a preferentially stable order of organization, as in their natural state, and may be disordered progressively under the influence of applied forces through various states towards ultimate conversion to basic energy. The intermediate states of order represent states of disorder relative to the preferential stable order, and the potential for returning to the preferential stable order is a measure of the force unbalance to which it is subjected. The potential to return to the preferred stable order increases as the degree of relative disorder increases, and the existing order is more readily influenced by any change in the applied forces. This is, in turn, accommodated by greater mobility of the parts of the particular type of matter in the new order, or relative disorder. Thus, when a particular compound is disordered by solvation in a solvent such as water, the ionic parts of the solute can be readily influenced to a new order by the proximity of an electrical charge. On the other hand, certain crystalline compounds can be thermally disordered without a solvent by heating the compound to the point of fusion where the new order is characterized by a very high degree of ion mobility and randomness. Such crystalline compounds are usually characterized by a predominantly ionic crystal lattice.

More particularly, in accordance with this invention, I have found that when the ion-containing and conducting medium is derived from a solution disordered compound, as when a compound is dissolved in a solvent, such as water, there are still certain limitations that prevent the attainment of optimum charge characteristics. Thus, the presence of solvent molecules which do not contribute active ions imposes limitations on ion content and mobility which restricts the quantum of charge that can be accommodated at the appropriate boundary interface. Also, the decomposition characteristics of such a solvent may impose limitations on the electrical, thermal and chemical conditions of operation. Thus, in accordance with this invention, I derive my ion-containing and conducting medium from a crystalline compound or from a mixture of such compounds which can be thermally disordered to provide the requisite ion content and mobility without the limitations of solvation.

This invention also contemplates an electrical energy storage device in which the ion-containing and conducting medium is solidified or otherwise returned to its stable crystalline order after the device has been charged. Thus, the device can be manufactured, stored and sold with a charge already impressed.

Briefly stated, a preferred embodiment of an electrical energy storage device made in accordance with this invention would employ at least one highly porous electron conductor functioning as a cathode in the form of a thin plate of finely divided particulate material, e.g. Raney nickel or activated carbon, having a surface area in the range from 100 m.$^2$/cc. to 1500 m.$^2$/cc. as determined by the conventional Brunauer, Emmet and Teller method, otherwise known as the B.E.T. method. This conducting plate in combination with another electron conductor which may be of the same or different material would be assembled with a non-conducting spacer, e.g., asbestos, between them and the assembly immersed in a vessel containing a crystalline compound or a mixture of crystalline compounds which can be thermally disordered to provide the requisite ion-containing and conducting medium, e.g., as a fused salt. The preferred ion progenitors are those which will provide an ion-containing and conducting medium whose specific resistivity is less than 100 ohm centimeters. Suitable heating means would be provided for raising and maintaining the temperature of the medium. In operation, the device would be charged by applying an electrical potential less than the decomposition potential of the medium across the conducting plates until the device is charged to its full capacity. The electrical energy thus stored may be selectively discharged through any suitable load.

Included in this invention is any cell which contains at least one electrode which consists of carbon or carbon-containing materials (such as charred polyacrylonitrile) having a surface area as measured by the B.E.T. technique mentioned above exceeding 100 meters$^2$/cm.$^3$ and which uses any molten salt electrolyte.

*The ion progenitor*

While this invention contemplates deriving an ion-containing and conducting medium from any crystalline compounds which can be thermally disordered to provide the requisite ion content and mobility, I will describe for illustrative purposes my preferred embodiment in which I employed salts having a crystalline structure characterized by a predominantly ionic lattice as the ion progenitors which were thermally disordered to provide the ion-containing and conducting medium in their fused states, it being understood that various oxides and hydroxides of metals may also be employed.

Figure 1B:
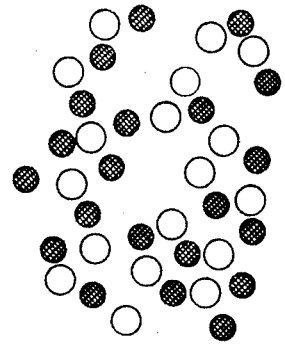

Therefore, in accordance with the preferred embodiment of this invention, one must recognize that at any temperature a chemical system achieves some compromise between the opposing forces of the internal energy and the entropy of the system, the former of which is driven towards minimum potential energy and the latter of which is characterized by a drive towards maximum randomness. Thus, at very low temperatures the positive and negative ions of a salt such as sodium chloride will be organized in a three-dimensional ionic crystal order such as diagrammatically illustrated in FIG. 1A, where the positive metal ions are represented by the smaller cross-hatched circles, and the negative chloride ions are represented by the larger circles. As the temperature of such a system is raised, the thermal kinetic energy tends to disrupt the order causing lattice defects to occur. These defects increase with temperature until the increase becomes catastrophic, at which point a major change in the order of organization occurs. This changed order might be diagrammatically represented by FIG. 1B to show that the long-range crystalline order has been destroyed as a consequence of the highly defective structure. The result is an increase in the randomness and hence in the entropy of system at the expense of an increase in potential energy, or decrease in stability, which equals the heat of fusion. The resulting liquid state represents a new order of organization, or relative disorder, characterized by a high degree of ion mobility.

As hereinbefore noted, I contemplate employing thermally disordered mixtures of crystalline compounds as well as individual compounds and, hence, eutectic mixtures of various salts may be employed as the ion-containing and conducting medium in accordance with this invention. While, in one sense, it might be considered that the salts in such a mixture are dissolved in each other, neither acts as an inhibiting solvent as in the case of water and each of the salts is thermally disordered to provide mobile ions that will contribute to the quantum of charge at the boundary interface with the electron conductors. One of the reasons for employing such eutectic mixtures is to limit the temperature requirements in attaining and maintaining the fused or molten state of disorder.

The eutectic mixtures useful as electrolyte in accordance with the present invention include the halides of the alkali metals and the alkaline earth metals and equally effectively but less desirable chemically the rare earth metals. In general, the eutectics as well as the individual and other mixed salts useful therein have melting points below about 600° C.

The following tables list binary and ternary systems and compositions together with melting points, which materials are useful as disorderable crystalline media in accordance with the present invention.

TABLE I.—BINARY SYSTEMS

| A Component | B Component | Eutectic, percent A | Melting Point (° C.) |
|---|---|---|---|
| LiCl | KCl | 58 | 352 |
| KCl[a] | MgCl$_2$ | 62 / 38 | 435 / 465 |
| MgCl$_2$ | NaCl | 38 | 450 |
| LiBr | LiF | 70 | 453 |
| LiF | RbF | 45 | 460 |
| MgCl$_2$[a] | RbCl | 27 / 34 / 62 | 459 / 472 / 510 |
| LiCl | LiF | 71 | 485 |
| LiCl | SrCl$_2$ | 65 | 487 |
| LiF | KF | 52 | 492 |
| CsCl | NaCl | 65 | 493 |
| CaCl$_2$ | LiCl | 44 | 496 |
| CsF | LiF | 64 | 500 |
| CaCl$_2$ | NaCl | 53 | 505 |
| BaCl$_2$ | LiCl | 37 | 512 |
| CsCl[a] | MgCl$_2$ | 21 / 27 / 37 / 70 | 510 / 511 / 548 / 542 |
| LiBr[b] | LiCl | 61 | 528 |
| LiSO$_4$ | K$_2$SO$_4$ | 80 | 532 |
| NaCl | RbCl | 46 | 542 |
| KF | KI | 32 | 546 |
| LiCl[b] | NaCl | 75 | 556 |
| KBr | KF | 41 | 570 |
| CaCl$_2$ | RbCl | 20 | 584 |
| NaCl | NaI | 33 | 585 |
| BaCl$_2$ | CaCl$_2$ | 28 | 594 |
| Li$_2$SO$_4$[b] | Na$_2$SO$_4$ | 58 | 590 |
| CaCl$_2$[a] | KCl | 25 | 606 |

[a] Stable compound formation evident on phase diagram.
[b] Solid solution rather than eutectics.

TABLE II.—TERNARY SYSTEMS

| Components | | | Eutectic Comp., percent | | Melting Point (° C.) |
|---|---|---|---|---|---|
| A | B | C | A | B | |
| CaCl$_2$ | LiCl | KCl | 5 / 30 | 50 / 55 | 340 / 425 |
| LiCl | KCl | NaCl | 55 | 34 | 346 |
| CaCl$_2$ | LiCl | NaCl | 40 | 25 | 350 |
| Li$_2$SO$_4$ | KCl | NaCl | 67 | 13 | 426 |
| LiF | NaF | RbF | 38 | 7 | 435 |
| Li$_2$SO$_4$ | KCl | Na$_2$SO$_4$ | 40 | 20 | 450 |
| LiF | NaF | KF | 45 | 11 | 454 |
| CaCl$_2$ | KCl | MgCl$_2$ | 26 / 1 | 26 / 62 | 455 / 510 |
| CaCl$_2$ | CsCl | NaCl | 50 / 3 | 1 / 53 | 480 / 482 |
| CaCl$_2$ | RbCl | NaCl | 55 / 13 | 2 / 54 | 500 / 502 |
| Li$_2$SO$_4$ | Na$_2$SO$_4$ | K$_2$SO$_4$ | 78 | 10 | 512 |
| KBr | KF | KI | 21 | 29 | 529 |
| NaBr | NaF | NaI | 26 | 15 | 583 |
| CaCl$_2$ | KCl | RbCl | [a]18–23 | −0 | ~590 |
| CaCl$_2$ | CsCl | KCl | [a]10–25 | −0 | ~600 |

[a] Percent CaCl$_2$.

The decomposition potential of the electrolyte system is desirably about 2.0 volts. The decomposition potentials of a number of pure halides are as follows:

TABLE III.—DECOMPOSITION POTENTIALS OF PURE HALIDES (700° C.)

| | Anions | | | | | | | |
|---|---|---|---|---|---|---|---|---|
| | Fluoride | | Chloride | | Bromide | | Iodide | |
| Cation | Melt (° C.) | Ep (volt) | Melt (° C.) | Ep (volt) | Melt (° C.) | Ep (volt) | Melt (° C.) | Ep (volt) |
| Li+ | 870 | a2.20 | 606 | 3.41 | 547 | 3.03 | 446 | 2.56 |
| Na+ | 990 | a2.76 | 800 | 3.39 | 755 | 2.98 | 651 | 2.42 |
| K+ | 880 | a2.54 | 768 | 3.53 | 730 | 3.16 | 723 | 2.59 |
| Rb+ | 760 | | 715 | 3.62 | 682 | 2.73 | 642 | 2.25 |
| Cs+ | 684 | | 646 | 3.68 | 636 | | 621 | 2.40 |
| Mg++ | 1,396 | | 718 | 2.61 | 700 | 2.21 | | 1.62 |
| Ca++ | 1,360 | b2.40 | 774 | 3.38 | 765 | 2.88 | 575 | 2.24 |
| Si++ | 1,190 | b2.43 | 810 | 3.54 | 643 | 3.04 | 402 | 2.55 |
| Ba++ | 1,280 | b2.53 | 960 | 3.62 | 847 | 3.25 | | |
| La+++ | | | 872 | 3.17 | 783 | | | | a At 1,000° C.  b At 1,400° C.

In accordance with this invention, it is an essential feature that the positive electrode be a porous carbon, preferably an activated carbon electrode, having a surface area of at least 100 m.²/cc. The nature of the remaining electrode is relatively unimportant and may include liquid electrodes where a liquid forms a coating on a solid metallic substrate. A preferred form of the invention, however, utilizes a pair of porous carbon electrodes, one positively charged with respect to the other and each having a surface area of at least 100 m.²/cc. However, any electron conductor may be used for the negative electrode or bank of electrodes in a device such as that shown in FIGS. 4 and 7.

The structure

Figure 2:
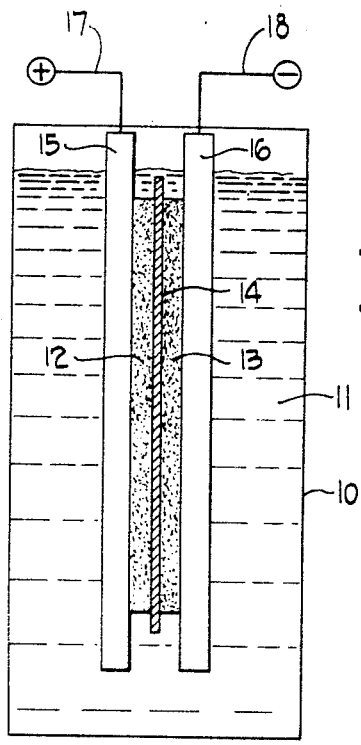
FIG. 2 is a diagrammatic illustration of one form of electrical energy storage device in accordance herewith.

Referring now more particularly to FIG. 2, there is here shown in diagrammatic form, a structure embodying the principles of the present invention and utilizing highly porous carbon electrodes.

Accordingly, there is here shown a sealed, self-contained housing 10 which may be of any suitable material capable of containing fused salts, oxides, or hydroxides without undergoing reaction therewith, for example non-porous graphite, sheet steel, sheet nickel, or nickel alloys, ceramics, alumina, silica sealed alumina, etc. The housing 10 may also be conveniently provided with any conventional means for maintaining the temperature of an ion-containing and conducting medium 11 at or above the fusion temperature.

In the embodiment illustrated, there are provided a pair of highly porous carbon electrodes 12 and 13 in spaced relation to each other and maintained separate by a suitable separator member 14 formed from, for example, a fibrous nonconducting material, e.g., asbestos cloth, which, in turn, is readily permeable by the ion-containing and conducting medium 11. Current collectors 15 and 16, which may be formed from solid graphite plates, are provided with leads 17 and 18 adapted to be connected either to a charging circuit or to a load of conventional design and construction. Instead of graphite, tantalum metal may be used as a current collector material.

Any suitable means for clamping the electrodes 12 and 13 in combination with separator 14, for example non-conducting bolts extending through the assembly, or clamp, may be employed.

In the embodiment shown in FIG. 2, the current collectors 15 and 16 are solid graphite and are closely laminated with the planar porous carbon electrodes 12 and 13, respectively. Electrodes 12 and 13 are high surface area electrodes formed by compacting very finely divided activated carbon. The specific surface area of such electrodes was practically in the range of from about 250 m.²/cc. to as high as 900 m.²/cc. In one example, the porous carbon electrodes each had a surface area of approximately 600 m.²/cc., each of the electrodes being approximately .0625″ thick by 1.1875″ by 1.75″ and having a total weight of approximately .031 pound.

The asbestos spacer used in the preferred example was an asbestos cloth spacer, it being understood, that any non-conducting inert spacing material may be used in place of the perferred material.

Typical examples of materials which may be used as ion progenitors for the ion-containing and conducting medium of the present invention include various salts, oxides and hydroxides of metals, and mixtures of such materials, and particularly eutectic mixtures thereof. A particularly useful salt mixture is composed of lithium and potassium chlorides having a composition of 58.5 mol percent lithium chloride and 41.5 mol percent potassium chloride. When a device constructed in accordance with the preferred embodiment is operated using the latter eutectic composition at temperatures in the range of 350° C. to 500° C., power outputs of the order of one horsepower per pound have been secured. Other fused media may, of course, be used in place of the preferred lithium chloride-potassium chloride eutectic, such as for example, NaCl-KCl eutectic, pure NaCl, NaCl-AlCl₃, or NaCl-TiCl₄. As previously noted, however, ion progenitors which will provide an ion-containing and conducting medium having a specific resistivity of less than 100 ohm centimeters are preferred.

Reference may be had to FIGS. 5 and 6 which show the discharge and charge curves at various temperatures and at various amperages for a cell having a structure such as shown in FIG. 2 utilizing electrodes specifically as described above.

The cell units of the present invention lend themselves to connection in battery with cells of similar construction either by connection of a number of cell units in parallel or in series, or by utilization of a stack of electron conductors each separated by nonconducting spacers of very thin cross section, and whereby the intermediate electrodes act as bipolar electrodes cumulatively aiding their respective outputs as if connected in series. A number of cell units constructed as shown for example in FIG. 3 may be assembled in a matrix such as shown in FIG. 4 to provide an electrical storage device of high capacity for use in stationary equipment or in automotive devices.

Figure 3:
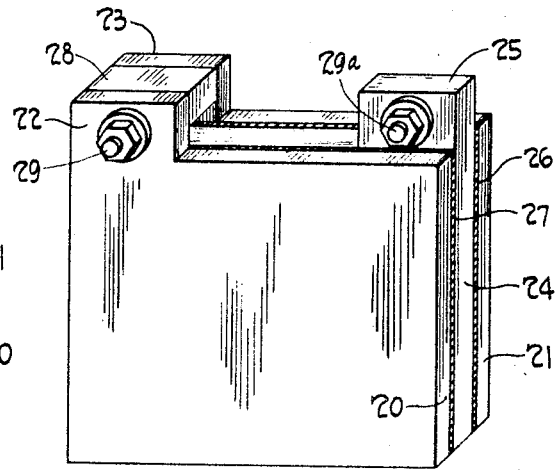
FIG. 3 is a perspective view of an electrical energy storage device useful for storing electrical energy in conjunction with an electrostatically orientable medium as a single unit or a multiplicity of such units.

Referring more particularly now to FIG. 3, there is here shown a carbon plate insert composed of a pair of similarly shaped very high surface area porous active carbon plates 20 and 21, having, respectively, lug portions 22 and 23 extending from one marginal edge thereof. Disposed between plates 20 and 21 is a porous active carbon plate 24 also provided with a lug portion 25 extending from a marginal edge thereof. Disposed between plates 20 and 21 is a porous active carbon plate 24 also provided with a lug portion 25 extending from a marginal edge thereof and adapted to be disposed oppositely from lugs 22 and 23. Plate 24 is maintained separate and in spaced relation from plates 20 and 21 by nonconducting spacers 26 and 27 which, as indicated above, may be formed from a material such as asbestos cloth. The plates 20 and 21 are interconnected electrically by means of the graphite connector 28. Suitable graphite nuts and bolts 29 and 29a may be employed to assemble the inserts and to provide electrical connectors. Thus, each insert provides two cells connected in parallel with the plate 24 acting as a common electrode. Several inserts may in turn be assembled to form a multicell battery as shown in FIG. 4 of the drawings.

FIG. 4 illustrates a compartmented graphite block 30 having a plurality of compartments formed therein of generally rectilinear configuration, open at the top but otherwise closed for containing the polarizable medium and receiving cell inserts of the type shown in FIG. 3. The compartmented block 30 is surrounded by a stainless steel case 32 having a coating of an insulating cement 33 on the exterior surfaces thereof. Although any suitable means for supplying heat to the multiple unit assembly may be employed, a preferred and convenient heater comprises a continuous Nichrome wire heating 34 wound about the stainless steel case 32 and spaced therefrom by means of the insulating cement, e.g., asbestos cement, coating. Strip heaters of the resistance type may also be used for supplying heat to the assembly.

To conserve heat, there is conveniently and preferably provided an external insulation sheath 35 formed from any convenient heat insulation material, for example asbestos.

Each of compartments 31 is preferably provided with a relatively thin asbestos liner to insulate the cell inserts from the compartmented graphite block 30. Several cell inserts 36 are shown in position in the container, adjacent inserts being connected in series by graphite terminal connectors 37, 38 and 39. In similar fashion, the remaining compartments 31 are fitted with cell inserts 36 for series connection with those shown in position in FIG. 4. When all of the compartments 31 are filled with cell inserts 36, an ion-containing and conducting medium such as fused lithium chloride-potassium chloride eutectic is poured into the cavity 31 to cover the electron conducting plates of the cell insert 36. The entire apparatus may then be provided with a suitable cover formed from other material such as asbestos or an asbestos covered steel plate.

FIG. 7 is a partially cut-away perspective view of another embodiment of a low voltage, high capacity storage device of the present invention. It is composed of a plurality of assembled units connected in series and provided with leads to suitable external terminals. The individual units are in turn composed of a plurality of conducting plates disposed in spaced laminar relation and connected in parallel. Nonconducting separators maintain the plates in spaced relation. Thus, in FIG. 7 there is shown by cutting away a corner of the device, part of one unit composed of seven thin porous carbon plates 40, each having a current collector band 41 of metal peripherally surrounding the plate. Spacers of separators 42, which are conveniently thin porous sheets of asbestos, are in alternate laminar relation with plates 40 to maintain them out of electrical contact with each other. Depending on the polarity selected during charge, the first third, fifth and seventh plates 40 will be positively or negatively charged, and the remaining plates 40 will have an opposite charge. The second, fourth and sixth plates 40 are provided with lugs 43 which electrically communicate with collector bar 44 which in turn is connected to terminal 45. In like manner, the first, third, fifth and seventh plates are provided with lugs, not shown, which are similarly interconnected within the unit and then connected in series with the interconnected second, fourth, and sixth plates of an adjacent unit. The series connection between the units is ultimately completed through a collector bar (not shown) to the terminal 46.

Individual units are separated from each other by impermeable heat resistant walls, such as wall 48, and enclosed by outer walls 49 and 50. Cover 51, suitably apertured for electrical connections, is also provided for complete sealing encasement of each unit for conservation of heat and to prevent intercommunication of fused salt from one unit to another. The spaces between plates 40 are filled with a fused salt, e.g., fused KCl-LiCl eutectic mixture.

Heat sufficient to maintain the salt in fused condition may be supplied by any suitable means, electrical or otherwise. A preferred means is a Nichrome wire or tape 55 wound about the external walls 49 and 50 and their counter parts, not shown. Terminals 56 and 57 are at the extremities of the tape, and are adapted to be connected to a suitable source of electrical energy.

The foregoing assembly of units in a confining box of asbestos sheet and wrapped with a heating element is then disposed in a suitable outer case 60. Outer case 60 is preferably a double wall shell having heat insulating properties, such as by evacuating the space between the inner shell wall 61 and the outer shell wall 62. Rock wool 63 or other suitable insulating and cushioning means may be provided between the outer case 60 and the cell unit assembly. The entire structure in one embodiment has a physical size comparable to the conventional six-volt automobile battery, and is superior in energy storage performance to conventional batteries.

The device of this invention will store and maintain a charge for a considerable length of time under prescribed operating conditions which include maintaining the ion-containing and conducting medium of the preferred embodiment in a fused state. Thus, the device can be charged, discharged and recharged while the electrolyte is in a fused state.

Alternatively, an electrical charge can be "frozen" as stored energy by allowing the ion-containing and conducting medium to return to its normal crystalline order after the charging potential has been withdrawn. Under such circumstances, apparently, the ionic lattice of the ion progenitor is fixed in a predetermined state of disorder determined by the applied charge. While the main body of the medium returns to its normal crystalline order, the portions at the interfaces with the electron conductors retain their predetermined disorder with a prominence of one electrical charge at one interface and a predominance of an opposite electrical charge at the other interface. This state of disorder is thus reversibly fixed in that the application of the requisite amount of thermal energy can return the medium to the fused state during which the stored energy can be discharged through a suitable load as hereinbefore described. This enables one to manufacture, store and sell such a device with a charge already impressed.

Other modes of applying the principle of this invention may be employed instead of those specifically set forth above, changes being made as regard to the details herein disclosed provided the elements set forth in any of the following claims, or the equivalent of such be employed.

I claim:

1. A sealed, self-contained rechargeable electrical energy storage device comprising in combination, a housing providing a cavity; a pair of electron conductors, one functioning as a cathode and the other as an anode, disposed in spaced relation from each other within said cavity, the electron conductor functioning as the cathode consisting essentially of carbon having a surface area in excess of 100 m.$^2$/cc.; a current collector connected to each electron conductor; a body of a crystalline ion progenitor disposed between and being in contact with said electron conductors consisting essentially of alkali halide salt or salts, alkaline earth halide salt or salts, or a mixture of said salts, having a predominantly ionic lattice adapted to be thermally disordered to provide an ion-containing and conducting medium; and means coacting with said ion progenitor to melt said ion progenitor and thereby thermally disorder the crystalline structure thereof and provide an ion-containing and conducting medium; said electron conductors coacting with the thermally disordered ion progenitor, in response to the application of an electrical potential across said electron conductors to develop and store electric energy.

2. The electrical energy storage device of claim 1 in which the ion-containing and conducting medium is selected from the group consisting of the fusible alkali metal halides and mixtures thereof.

3. The electrical energy storage device of claim 1 in which the crystalline ion progenitor consists of a mixture of lithium chloride and potassium chloride.

4. An electrical energy storage battery comprising a plurality of devices in accordance with claim 1, electrically interconnected in an arrangement selected from the group consisting of parallel and series arrangements.

5. A rechargeable electrical energy storage device comprising in combination, a housing providing a cavity; a pair of electron conductors, one functioning as a cathode and the other as an anode, disposed in spaced relation from each other within said cavity; an inert, nonconductive, permeable separator member occupying the space between said electron conductors; the electron conductor functioning as the cathode consisting essentially of carbon having a surface area in excess of 100 m.²/cc.; a current collector connected to each electron conductor; a body of a crystalline ion progenitor consisting essentially of alkali halide salt or salts, alkaline earth halide salt or salts, or a mixture of said salts, having a predominantly ionic lattice adapted to be thermally disordered to provide an ion-containing and conducting medium, filling the remainder of said cavity, permeating said separator member; and means coacting with said ion progenitor to melt said ion progenitor and thereby thermally disorder the crystalline structure thereof and provide an ion-containing and conducting medium; said electron conductors coacting with the thermally disordered ion progenitor, in response to the application of an electrical potential across said electron conductors to develop and store electric energy.

6. An electrical energy storage battery comprising a plurality of devices in accordance with claim 5, electrically interconnected in an arrangement selected from the group consisting of parallel and series arrangements.

References Cited

UNITED STATES PATENTS

| | | | |
|---|---|---|---|
| 2,291,739 | 8/1942 | McGrath | 136—83 |
| 2,384,463 | 9/1945 | Gunn et al. | 136—86 |
| 2,912,478 | 11/1959 | Justi et al. | 136—86 |
| 3,092,516 | 6/1963 | Rightmire | 136—86 |
| 3,132,971 | 5/1964 | Selis et al. | 136—153 |
| 3,158,510 | 11/1964 | Talvenheimo | 136—121 |
| 3,160,531 | 12/1964 | Spindler | 136—153 |
| 3,170,817 | 2/1965 | Mrgudich | 136—153 |
| 3,238,437 | 3/1966 | Foster et al. | 136—83 |
| 3,318,734 | 5/1967 | McCully | 136—6 |

A. B. CURTIS, *Primary Examiner.*

C. F. LE FEVOUR, *Assistant Examiner.*

U.S. Cl. X.R.

136—22, 121

UNITED STATES PATENT OFFICE
CERTIFICATE OF CORRECTION

Patent No. 3,447,968                                                    June 3, 1969

Robert A. Rightmire

It is certified that error appears in the above identified patent and that said Letters Patent are hereby corrected as shown below:

Column 2, line 26, "funsion" should read -- fusion --. Column 6, TABLE I, fourth column, line 17 thereof, "512" should read -- 510 --; same table, fourth column, line 18 thereof, "510" should read -- 511 --; same table, fourth column, line 19 thereof, "511" should read -- 518 --; same table, fourth column, line 20 thereof, "548" should read -- 542 --; same table, fourth column, line 21 thereof, "542" should read -- 548 --; same table, fourth column, line 22 thereof, "528" should read -- 522 --; same table, fourth column, line 24 thereof, "542" should read -- 546 --; same table, fourth column, line 25 thereof, "546" should read -- 544 --; same table, fourth column, line 26 thereof, "556" should read -- 552 --; same table, fourth column, line 27 thereof, "570" should read -- 576 --; same table, fourth column, line 28 thereof, "584" should read -- 580 --; same table, fourth column, line 31 thereof, "590" should read -- 596 --; same table, fourth column, line 32 thereof, "606" should read -- 600 --. Column 8, line 2, "perferred" should read -- preferred --. Column 9, line 35, "of" should read -- or --; line 39, "first" should read -- first, --.

Signed and sealed this 21st day of April 1970.

(SEAL)
Attest:

EDWARD M. FLETCHER, JR.                                WILLIAM E. SCHUYLER, JR.
Attesting Officer                                                 Commissioner of Patents